(12) United States Patent
Sun et al.

(10) Patent No.: US 10,531,066 B2
(45) Date of Patent: Jan. 7, 2020

(54) METHOD FOR DISPLAYING 3D IMAGE AND DEVICE FOR SAME

(71) Applicant: Samsung Electronics Co., Ltd., Gyeonggi-do (KR)

(72) Inventors: Zengzeng Sun, Shaanxi (CN); Penghui Qiao, Shaanxi (CN); Bing Hu, Shaanxi (CN); Yuan Zeng, Shaanxi (CN); Wei Gao, Shaanxi (CN)

(73) Assignee: Samsung Electronics Co., Ltd (KR)

( * ) Notice: Subject to any disclaimer, the term of this patent is extended or adjusted under 35 U.S.C. 154(b) by 91 days.

(21) Appl. No.: 15/741,144

(22) PCT Filed: Dec. 21, 2015

(86) PCT No.: PCT/KR2015/013992
§ 371 (c)(1),
(2) Date: Dec. 29, 2017

(87) PCT Pub. No.: WO2017/003054
PCT Pub. Date: Jan. 5, 2017

(65) Prior Publication Data
US 2018/0192023 A1     Jul. 5, 2018

(30) Foreign Application Priority Data

Jun. 30, 2015  (CN) .......................... 2015 1 0385882
Dec. 11, 2015  (KR) ........................ 10-2015-0177368

(51) Int. Cl.
*H04N 13/144*  (2018.01)
*H04N 13/128*  (2018.01)
(Continued)

(52) U.S. Cl.
CPC ......... *H04N 13/144* (2018.05); *H04N 13/128* (2018.05); *H04N 13/383* (2018.05); *H04N 13/398* (2018.05); *H04N 2213/002* (2013.01)

(58) Field of Classification Search
CPC .. H04N 13/144; H04N 13/128; H04N 13/383; H04N 13/398; H04N 2213/002
(Continued)

(56) References Cited

U.S. PATENT DOCUMENTS 8,203,599 B2   6/2012  Kim et al.
8,787,654 B2   7/2014  Zhang et al.
(Continued)

FOREIGN PATENT DOCUMENTS

CN    101703915    5/2010
CN    101838778    9/2010
(Continued)

OTHER PUBLICATIONS

International Search Report dated Apr. 8, 2015 issued in counterpart application No. PCT/KR2015/013992, 22 pages.
(Continued)

*Primary Examiner* — William C Vaughn, Jr.
*Assistant Examiner* — Jae N Noh
(74) *Attorney, Agent, or Firm* — The Farrell Law Firm, P.C.

(57) ABSTRACT

Provided is a device including a camera configured to capture an image of eyes of a user who is watching three-dimensional (3D) video; and a processor configured to obtain an eye feature of the user from the captured image of the eyes of the user, determine a degree of eyestrain degree of the user based on the obtained eye feature, and adjust a parallax of the 3D video according to the degree of eyestrain of the user.

18 Claims, 11 Drawing Sheets

(51) Int. Cl.
*H04N 13/383* (2018.01)
*H04N 13/398* (2018.01)
(58) Field of Classification Search
USPC .......................................................... 348/51
See application file for complete search history.

(56) References Cited

U.S. PATENT DOCUMENTS

| | | | |
|---|---|---|---|
| 9,268,145 | B2 | 2/2016 | Kato et al. |
| 9,300,942 | B2 | 3/2016 | Zeng et al. |
| 2006/0215261 | A1 | 9/2006 | Sato |
| 2011/0157164 | A1 | 6/2011 | Suzuki |
| 2011/0228051 | A1 | 9/2011 | Dedeoglu et al. |
| 2012/0293622 | A1 | 11/2012 | Hyodo |
| 2013/0249874 | A1 | 9/2013 | Song et al. |
| 2014/0036046 | A1* | 2/2014 | Hasegawa ............ H04N 13/128 348/54 |
| 2014/0139647 | A1 | 5/2014 | Nagatani |
| 2014/0320613 | A1 | 10/2014 | Nam et al. |
| 2015/0070477 | A1 | 3/2015 | Taki |
| 2017/0276956 | A1 | 9/2017 | Morifuji et al. |

FOREIGN PATENT DOCUMENTS

| | | |
|---|---|---|
| CN | 102006493 | 4/2011 |
| CN | 102027752 | 4/2011 |
| CN | 102111633 | 6/2011 |
| CN | 102917232 | 2/2013 |
| CN | 103260040 | 8/2013 |
| CN | 103283243 | 9/2013 |
| CN | 103780894 | 5/2014 |
| CN | 104185986 | 12/2014 |
| CN | 104967837 | 10/2015 |
| JP | 2012-22150 | 2/2012 |
| KR | 1020070078225 | 7/2007 |
| KR | 1020110121794 | 11/2011 |
| KR | 1020120099976 | 9/2012 |
| KR | 1020130125777 | 11/2013 |
| KR | 10-1343551 | 12/2013 |
| WO | WO 2014/024649 | 2/2014 |

OTHER PUBLICATIONS

European Search Report dated May 25, 2018 issued in counterpart application No. 15897272.9-1209, 8 pages.
Chinese Office Action dated Jul. 5, 2016 issued in counterpart application No. 201510385882.2, 20 pages.
Chinese Office Action dated Mar. 14, 2017 issued in counterpart application No. 201510385882.2, 22 pages.
Chinese Office Action dated Jun. 19, 2017 issued in counterpart application No. 201510385882.2, 17 pages.

* cited by examiner

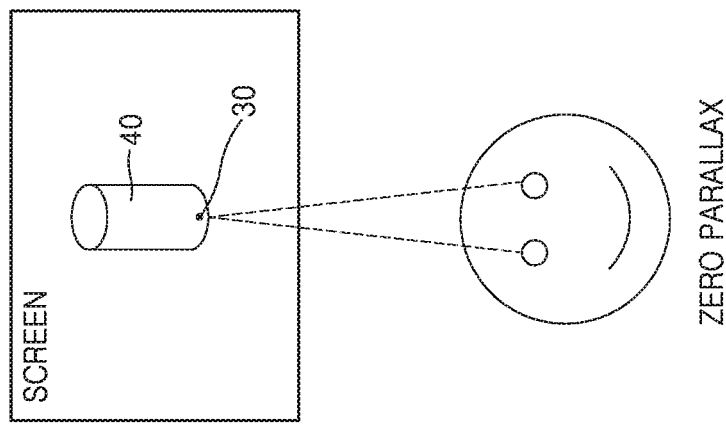
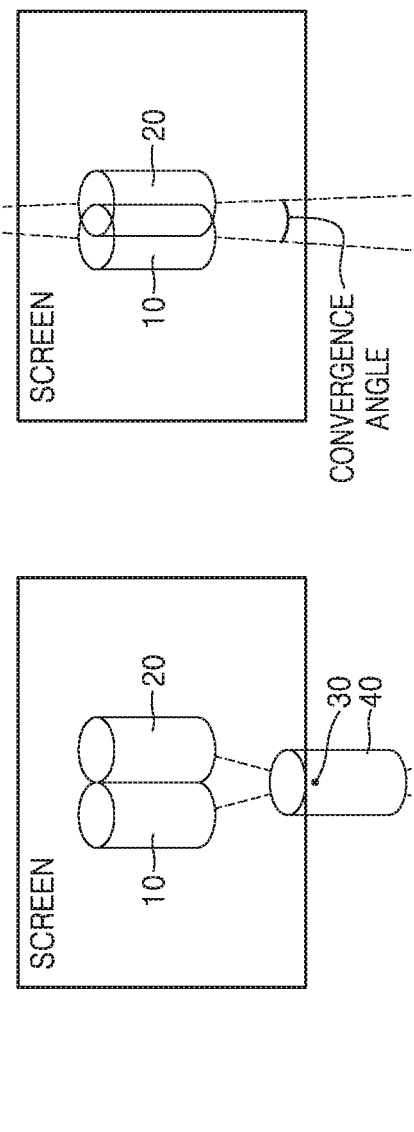
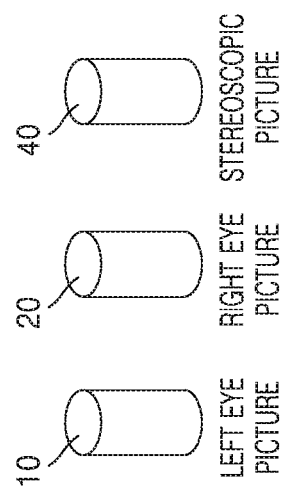

PREVIOUS
FRAME PICTURE

CURRENT
FRAME PICTURE

INCREASE
OR
EXTETND

CURRENT FRAME PICTURE
AFTER BEING ADJUSTED

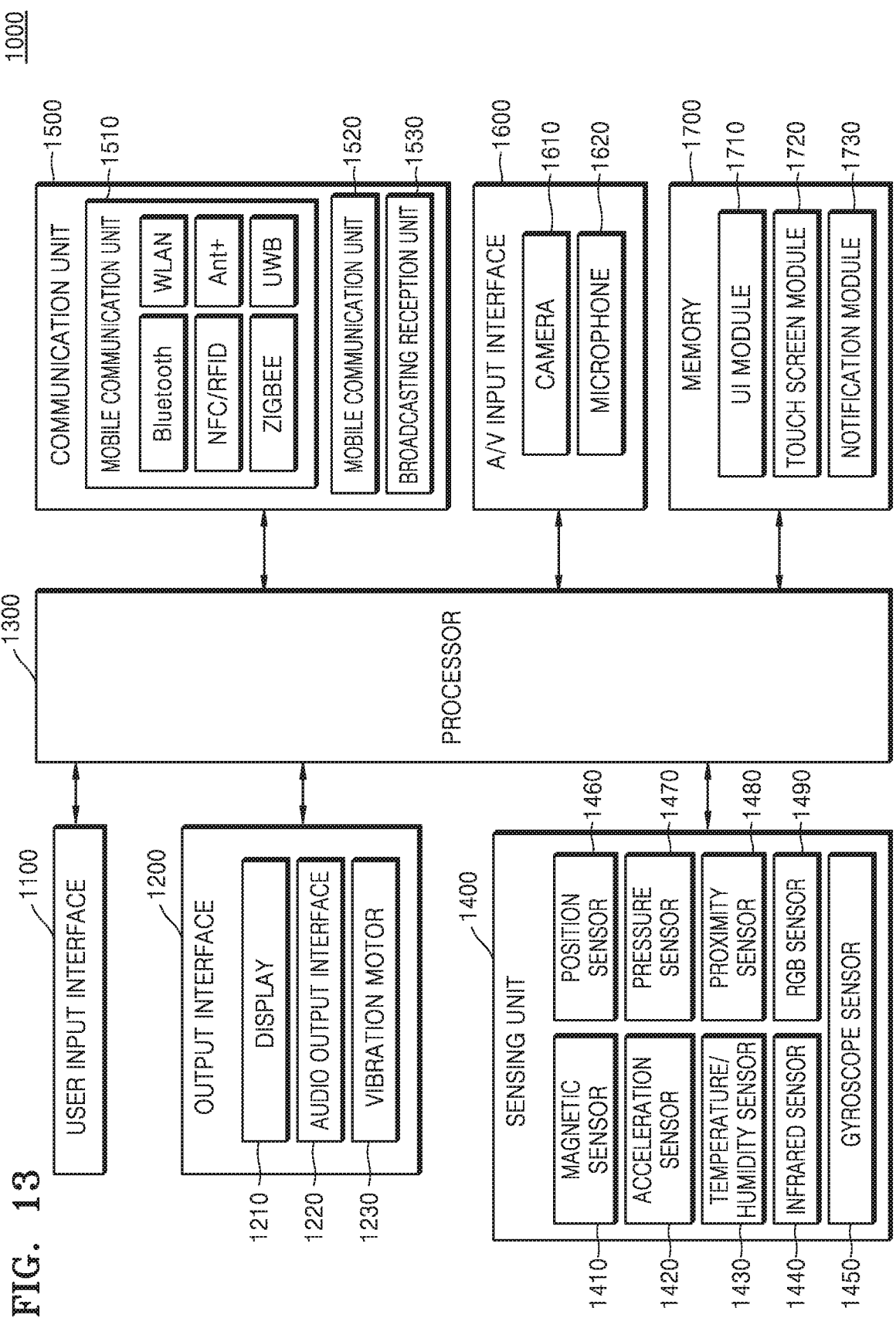

METHOD FOR DISPLAYING 3D IMAGE AND DEVICE FOR SAME

PRIORITY

This application is a National Phase Entry of PCT International Application No. PCT/KR2015/013992, which was filed on Dec. 21, 2015, and claims priority to Chinese Patent Application No. 201510385882.2, which was filed on Jun. 30, 2015, and to Korean Patent Application No. 10-2015-0177368, which was filed on Dec. 11, 2015, the contents of each of which are incorporated herein by reference.

TECHNICAL FIELD

The present disclosure relates to a three-dimensional (3D) display technology, and more particularly, to a device and method of adjusting a 3D display effect.

BACKGROUND ART

As electronic technology and three-dimensional (3D) display technology rapidly develop, a variety of electronic devices that support 3D video reproduction are used in daily life. Accordingly, users can view a 3D video without needing to go to movie theatres. In addition, a stereoscopic depth effect of such 3D video provides users with an enhanced visual experience. At present, research into 3D display technology has become more widespread in the display field.

The principle of 3D display technology is to achieve binocular parallax by providing two slightly different images to left and right eyes, respectively, thereby producing a 3D stereoscopic effect in the brain. For example, the position of a first object 10 in a left eye picture may be different from that of a first object 20 within a right eye picture. Throughout this specification, a left eye picture may refer to a picture provided to the left eye, and a right eye picture may refer to a picture provided to the right eye.

The parallax may refer to a difference between the positions of the same object in left and right eye pictures. In other words, the parallax may refer to a difference between a position of an object on the left retina and a position of the same object on the right retina. For example, when an image of an object is made incident at a distance of 4 mm from the fovea of the left eye and an image of the same object is made incident at a distance of 3 mm from the fovea of the right eye, the parallax of the object may be 1 mm. The parallax may also refer to a difference between a position of an object on the left eye picture and a position of the same object on the right eye picture.

In a stereoscopic display system based on a display screen, the larger the parallax is, the more distinct the out-of-screen and in-screen effect of the object. The out-of-screen effect may refer to a stereoscopic effect in which an object appears to protrude out from a screen, and the in-screen effect may refer to a stereoscopic effect in which an object appears to enter into a screen.

In detail, according to the difference between the positions of the same object on the screen in left and right eye pictures, the parallax may be divided into a negative parallax, a positive parallax, and a zero parallax.

DETAILED DESCRIPTION OF THE INVENTION

Technical Problem

The present invention provides an apparatus and method for adjusting a parallax in three-dimensional (3D) video, based on a degree of eyestrain of a user.

DESCRIPTION OF THE DRAWINGS

FIGS. 1A, 1B and 1C illustrate respective examples of a negative parallax, a positive parallax, and a zero parallax in three-dimensional (3D) display technology.

FIG. 13 is a block diagram of a device according to another embodiment of the present disclosure.

BEST MODE

Figure 2:
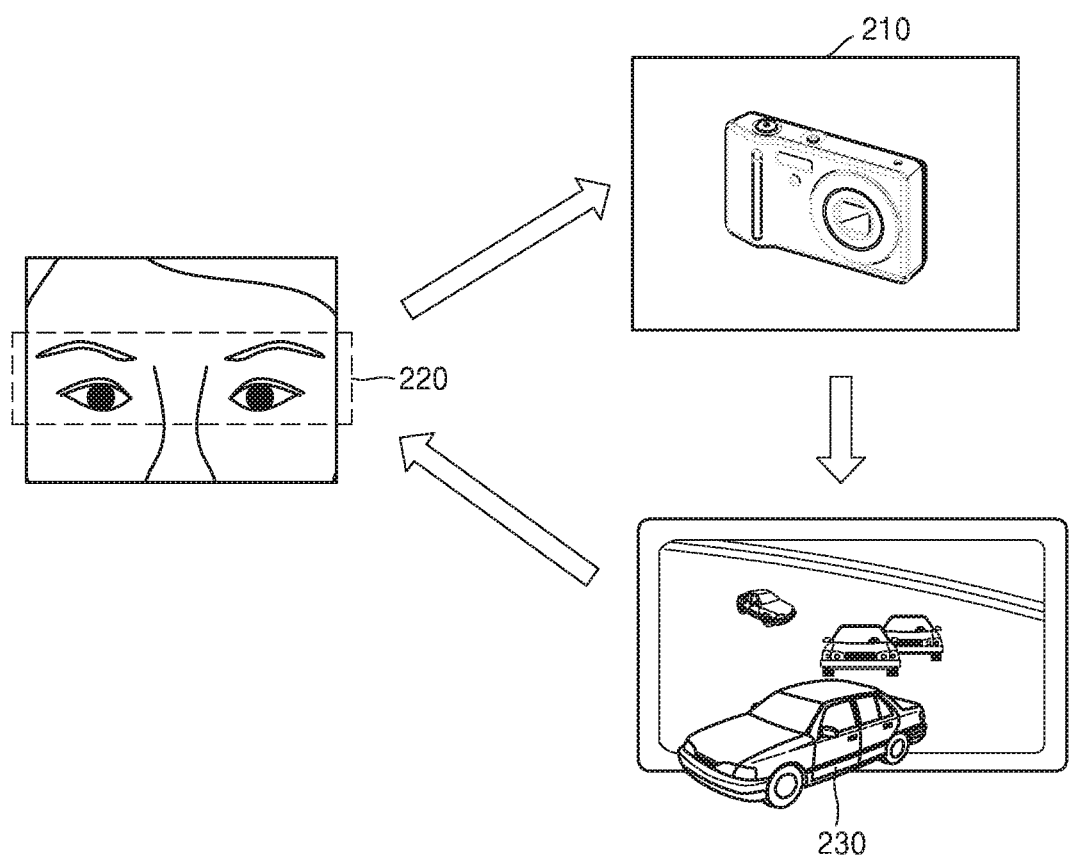
FIG. 2 is a diagram illustrating adjusting of a 3D display effect according to a current degree of eyestrain of a user according to an embodiment of the present disclosure.

According to an aspect of the present invention, there is provided a device including a camera configured to capture an image of eyes of a user who is watching three-dimensional (3D) video; and a processor configured to obtain an eye feature of the user from the captured image of the eyes of the user, determine a degree of eyestrain degree of the user based on the obtained eye feature, and adjust a parallax of the 3D video according to the degree of eyestrain of the user.

The processor may adjust the parallax of the 3D video by adjusting at least one of a mean parallax between a left eye image and a right eye image of the 3D video, a maximum value of a negative parallax between the left and right eye images, a maximum value of a positive parallax between the left and right eye images, and a parallax range that is a difference between the maximum value of the negative parallax and the maximum value of the positive parallax.

The eye feature of the user may include at least one of a blinking frequency, an eye-closed time, a change in binocular focus points, and a binocular convergence angle.

When the determined degree of eyestrain of the user is equal to or greater than a first threshold, the processor may adjust the parallax of the 3D video.

The processor may determine whether the parallax of the 3D video is equal to or greater than a second threshold, and, when the parallax of the 3D video is equal to or greater than the second threshold, the processor may adjust the parallax of the 3D video to be less than the second threshold.

The processor may adjust the parallax of the 3D video by adjusting a change rate of a parallax between frames of the 3D video.

The processor may determine a difference between parallaxes of an n-th frame and an (n−1)th frame of the 3D video, and, when the difference between the parallaxes is equal to or greater than a third threshold, the processor may adjust the parallax of the n-th frame such that the difference between the parallaxes is less than the third threshold, to thereby adjust the change rate of the parallax between the frames of the 3D video.

The processor may increase the parallax of the n-th frame such that the difference between the parallaxes is less than the third threshold, to thereby adjust the change rate of the parallax between the frames of the 3D video.

The device may further include an output interface, wherein the processor may control the output interface to output, to the user, a parallax-adjusted 3D video obtained by adjusting the parallax of the 3D video.

The device may display, on the output interface, a notification window indicating that the parallax of the 3D video has been adjusted.

According to another aspect of the present invention, there is provided a method of adjusting a 3D display effect includes capturing an image of eyes of a user who is watching 3D video; obtaining an eye feature of the user from an image of the captured image of the eyes of the user; determining a degree of eyestrain of the user, based on the obtained eye feature; and adjusting a parallax of the 3D video according to the degree of eyestrain of the user.

The adjusting of the parallax of the 3D video according to the degree of eyestrain of the user may include adjusting at least one of a mean parallax between a left eye image and a right eye image of the 3D video, a maximum value of a negative parallax between the left and right eye images, a maximum value of a positive parallax between the left and right eye images, and a parallax range that is a difference between the maximum value of the negative parallax and the maximum value of the positive parallax.

The adjusting of the parallax of the 3D video according to the degree of eyestrain of the user may include, when the determined degree of eyestrain of the user is equal to or greater than a first threshold, adjusting the parallax of the 3D video.

The adjusting of the parallax of the 3D video according to the degree of eyestrain of the user may include determining whether the parallax of the 3D video is equal to or greater than a second threshold, and, when the parallax of the 3D video is equal to or greater than the second threshold, adjusting the parallax of the 3D video to be less than the second threshold.

The adjusting of the parallax of the 3D video according to the degree of eyestrain of the user may include adjusting the parallax of the 3D video by adjusting a change rate of a parallax between frames of the 3D video.

The adjusting of the parallax of the 3D video by adjusting the change rate of the parallax between frames of the 3D video may include determining a difference between parallaxes of an n-th frame and an (n−1)th frame of the 3D video, and, when the difference between the parallaxes is equal to or greater than a third threshold, adjusting the parallax of the n-th frame such that the difference between the parallaxes is less than the third threshold, to thereby adjust the change rate of the parallax between the frames of the 3D video.

The adjusting of the parallax of the n-th frame such that the difference between the parallaxes is less than the third threshold may include increasing the parallax of the n-th frame such that the difference between the parallaxes is less than the third threshold, to thereby adjust the change rate of the parallax between the frames of the 3D video.

The method may further include outputting, to the user, a parallax-adjusted 3D video obtained by adjusting the parallax of the 3D video.

The method may further include displaying a notification window indicating that the parallax of the 3D video has been adjusted.

MODE OF THE INVENTION

Hereinafter, the terms used in the specification will be briefly described, and then the present invention will be described in detail.

Although general terms widely used at present were selected for describing the present invention in consideration of the functions thereof, these general terms may vary according to intentions of one of ordinary skill in the art, case precedents, the advent of new technologies, and the like. Terms arbitrarily selected by the applicant of the present invention may also be used in a specific case. In this case, their meanings need to be given in the detailed description of the invention. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms " . . . unit" and " . . . module" when used in this specification refers to a unit in which at least one function or In operation is performed, and may be implemented as hardware, software, or a combination of hardware and software.

Embodiments of the present invention are described in detail herein with reference to the accompanying drawings so that this disclosure may be easily performed by one of ordinary skill in the art to which the present invention pertain. The present disclosure may, however, be embodied in many different forms and should not be construed as being limited to the embodiments set forth herein. In the drawings, parts irrelevant to the description are omitted for simplicity of explanation, and like numbers refer to like elements throughout.

In the related art, according to a method of improving the comfort level of the eyes of a user by reducing the parallax of an object, when a user views a 3D video, a satisfactory 3D stereoscopic display effect may be caused due to the improvement of the comfort. However, the effect of a picture may become similar to 2D display.

To address this problem, according to some embodiments of the present disclosure, when a user views a 3D video, a parallax parameter of the 3D video may be adjusted according to the current degree of eyestrain of the user. By adjusting the parallax parameter of the 3D video according to the current degree of eyestrain of the user, a stereoscopic display effect of the 3D video may be maximized while reducing the eyestrain of the user.

FIGS. 1A, 1B and 1C illustrates respective examples of a negative parallax, a positive parallax, and a zero parallax in 3D display technology. As shown in FIG. 1A, an object 40 may have a negative parallax, and a user may feel like the object 40 with a negative parallax is located in front of a screen. As shown in FIG. 1B, the object 40 may have a positive parallax, and the user may feel like the object 40 with a positive parallax is located behind the screen. As shown in FIG. 1C, the object 40 may have a zero parallax, and the user may feel like the object 40 with a zero parallax is displayed on the screen, that is, the object 40 is displayed with a traditional 2D display effect without any perceptual depth effect from a picture. In general, compared with the positive parallax, the negative parallax may provide a more distinct stereoscopic effect. In the case of either a positive parallax or a negative parallax, a stereoscopic effect corresponding to a larger parallax value is more distinct than that of a smaller parallax value.

The larger the parallax is, the stronger the depth perception of which the user can feel is. However, a larger parallax causes discomfort and eyestrain of the user, and thus it is easy to increase the burden of the eyes of the user. According to Panum's laws, the eyes of a user have limited capability with respect to merging two pictures with parallax into one picture. In other words, when the parallax is larger than a certain value, the user may see two pictures rather than one picture. From another aspect, when viewing an object, two eyes of the user should focus on the object so that the user can combine different images seen by the two eyes into one stereoscopic image through a fusion function of his or her brain. An angle formed between lines of sight from the two eyes to a focus point 30 may be called a convergence angle.

As shown in FIGS. 1A and 1B, the object 40 with a negative parallax shown in FIG. 1A has a larger convergence angle compared with the object 40 with a positive parallax shown in FIG. 1B. In physiology, it is easy to cause eyestrain when viewing an object with a large convergence angle (that is, when viewing the object at a near distance). Accordingly, compared with an object with a positive parallax, an object with a negative parallax has an enhanced stereoscopic effect, but may cause eyestrain more easily.

Generally, in the related art, a processing technology of reducing the parallax of an object in a stereoscopic video is designed such that both the positive parallax and the negative parallax are limited within a certain range. The parallax being reduced may mean being closer to a zero parallax so as to form a smaller convergence angle, which causes the effect of the picture to seem more like a 2D playback. Accordingly, although the comfort level of the eyes is improved, the 3D stereoscopic display effect of the picture may be sacrificed. The reduction in the 3D stereoscopic display effect of the picture may cause the effect of the picture to seem more like a 2D playback. For this reason, the user's stereoscopic feeling will be greatly degraded when the stereoscopic viewing comfort level is improved by reducing the parallax.

In addition, a large parallax or large convergence angle within a certain range may not have an immediate influence on the eyestrain and the comfort level. Likewise, the user may feel uncomfortable in his or her eyes only after watching a book or a computer display for a long time. Accordingly, even when a 3D playback of the same parallax is performed, the degree of fatigue felt by the user may vary depending on a watching time period or an eye state of the user.

In conclusion, in an existing scheme for adjusting a 3D stereoscopic display effect, the stereoscopic display effect of a 3D video cannot be guaranteed while ensuring the healthy use of the eyes of a user.

FIG. 2 is a diagram of adjusting a 3D display effect according to a current degree of eyestrain of a user according to an embodiment of the present disclosure.

As illustrated in FIG. 2, for example, when a 3D video 230 is being viewed by a user, a head image of the user may be captured by an image capturing device 210 (e.g., a camera), and a face recognition may be performed based on a computer vision library (e.g., an Opencv library), so as to parse an eye image 220 of the user. An eye feature of the user may be obtained from the eye image 220 of the user. After the eye feature is obtained, a current degree of eyestrain of the user may be determined based on the obtained eye feature, and a parallax parameter of the 3D video 230 may be adjusted based on the current degree of eyestrain of the user. Accordingly, the comfort level may be improved when viewing the 3D video 230. In this way, the 3D display effect may be automatically adjusted based on the current degree of eyestrain of the user. Therefore, the 3D display effect may be ensured, and at the same time a discomfort in the eyes of the user caused when viewing the 3D video 230 may be effectively reduced.

Figure 3:
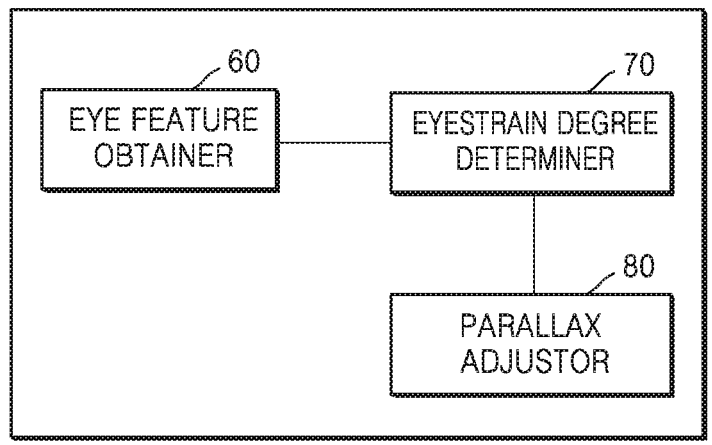
FIG. 3 is a block diagram of a device according to an embodiment of the present disclosure.

FIG. 3 is a block diagram of a device 1000 according to an embodiment of the present disclosure.

Referring to FIG. 3, the device 1000 may include an eye feature obtainer 60, an eyestrain degree determiner 70, and a parallax adjustor 80. The components of the device 1000 may be accomplished by an image sensor for performing a specific function, a general-purpose hardware processer such as a digital signal processor (DSP) and a field programmable gate array (FPGA), or a special-purpose hardware processor such as a dedicated chip, or may be completely accomplished as software through a computer program, such as, individual modules in an application for adjusting a 3D display effect that is installed in the device 1000.

The eye feature obtainer 60, the eyestrain degree determiner 70, and the parallax adjustor 80 may be accomplished by executing software, such as a computer program, by using hardware. In this case, the eye feature obtainer 60, the eyestrain degree determiner 70, and the parallax adjustor 80 may be realized as a single controller (not shown). Alternatively, the eye feature obtainer 60 and the eyestrain degree determiner 70 may be realized as a single controller (not shown), and the parallax adjustor 80 may be realized as a separate image processor (not shown). In the device 1000, the eye feature obtainer 60 is used to obtain an eye feature of a user when the user is viewing a 3D video.

In detail, the eye feature obtainer 60 may control an image capturing device to capture a head image of the user when the user is viewing a 3D video, and, after the head image of the user is obtained, may perform a face recognition on the head image of the user based on a computer vision library so as to parse an eye image of the user from a recognized face region. The eye feature obtainer 60 may extract an eye feature of the user from the obtained eye image.

For example, the eye feature obtainer 60 may extract, from the captured eye image of the user when the user is viewing the 3D video, at least one of a blinking frequency, an eye-closed time, a change in binocular focus points, and a binocular convergence angle as the eye feature.

The eyestrain degree determiner 70 may determine a current degree of eyestrain of the user according to the obtained eye feature. For example, the degree of eyestrain may be a value representing a current degree of eyestrain of the user that is dynamically determined based on the obtained eye feature.

For example, as the number of times the eyes blink per unit time increases, the eyestrain degree determiner 70 may determine that the current degree of eyestrain of the user is high.

For example, as the time during which the user is closing his or her eyes increases, the eyestrain degree determiner 70 may determine that the current degree of eyestrain of the user is high.

For example, when the eye feature obtained by the eye feature obtainer 60 is a change in binocular focus points of the user, the eyestrain degree determiner 70 may synthetically analyze a value representing a current degree of eyestrain of the user, based on the change in the binocular focus points of the user. For example, the eyestrain degree determiner 70 may determine that the current degree of eyestrain of the user is high, when a change in binocular focus points per unit time is frequent.

For example, when the binocular convergence angle is equal to or greater than a critical value, as the binocular convergence angle increases, the eyestrain degree determiner 70 may determine that the current degree of eyestrain of the user is high.

The parallax adjustor 80 may adjust a parallax parameter of the 3D video according to the current degree of eyestrain of the user. The parallax parameter may refer to a mean parallax of each pixel pair between a left eye image and a right eye image of the 3D video, a maximum value of a negative parallax of the pixel pair therebetween, a maximum value of a positive parallax of the pixel pair therebetween, or a parallax range of the pixel pair therebetween. As described above, the parallax may refer to a difference between the positions of the same object in left and right eye images.

Accordingly, in order to obtain the parallax parameter of the 3D video, an image matching method in which a pixel corresponding to, namely, matched with, each pixel in the left eye image is detected from the right eye image and a parallax between two matched pixels (i.e., a difference of displacement) is obtained may be executed. A pixel in the left eye image and a pixel in the right eye image corresponding to the pixel in the left eye image may mean a pixel in the left eye image and a pixel in the right eye image both representing a single point within the same object.

As the parallax of each pixel in the 3D video is obtained, a mean parallax of the 3D video or a parallax range comprised of a maximum parallax and a minimum parallax may be obtained. By adjusting the mean parallax or the parallax range, the user's eyestrain may be degraded. The mean parallax may refer to a mean of parallax between matched pixels, and the parallax range may refer to a difference between maximum values of a positive parallax and a negative parallax from among the parallax between matched pixels.

In detail, after the current degree of eyestrain of the user is determined by the eyestrain degree determiner 70, the parallax adjustor 80 may determine whether the current degree of eyestrain of the user is equal to or greater than an eyestrain threshold. The eyestrain threshold may be a preset critical value used to determine whether the user experiences eye fatigue. For example, by comparing the current degree of eyestrain of the user with the eyestrain threshold, it may be determined whether a 3D display effect should be adjusted. For example, when the current degree of eyestrain of the user is less than the eyestrain threshold, the parallax adjustor 80 may not adjust the parallax parameter of the 3D video.

On the other hand, when the current degree of eyestrain of the user is equal to or greater than the eyestrain threshold, the parallax adjustor 80 may adjust the parallax parameter of the 3D video in an appropriate way. For example, when the current degree of eyestrain of the user is equal to or greater than the eyestrain threshold, the parallax adjustor 80 may determine whether the parallax parameter of the 3D video is equal to or greater than a parallax parameter threshold. When the parallax parameter is equal to or greater than the parallax parameter threshold, the parallax adjustor 80 may adjust the parallax parameter of the 3D video to be within the parallax parameter threshold. The parallax parameter threshold may be previously determined, or dynamically determined according to the current degree of eyestrain of the user.

For example, the parallax parameter threshold may be a predetermined mean parallax, a predetermined parallax range, or a predetermined unique mean parallax, or may be a parallax range corresponding to the current degree of eyestrain of the user. In detail, an appropriate parallax parameter adjustment function $p=f(t, d)$ may be selected according to a preset condition, and the parallax parameter may be adjusted to be within the parallax parameter threshold according to the parallax parameter adjustment function $p=f(t, d)$, in which p may refer to a parallax parameter of the 3D video after being adjusted, t may refer to the current degree of eyestrain of the user, and d may refer to a parallax parameter of the 3D video before being adjusted. In the parallax parameter adjustment function $p=f(t, d)$, the parallax parameter threshold may be a decrease function of the current degree of eyestrain of the user. In other words, the parallax parameter threshold of the 3D video may decrease as the current degree of eyestrain of the user increases.

According to the visual characteristic of a human eye that the human eye focuses when viewing an object, a processing technology of adjusting the parallax may be not only a method of reducing the mean parallax or parallax range, but also a method of ensuring a smooth change in the parallax so as to prevent the human eye from feeling uncomfortable due to a constantly changing parallax.

The parallax adjustor 80 may also determine whether a difference between parallax parameters of a current frame and a previous frame of the 3D video is equal to or greater than a parallax change threshold. When the difference is equal to or greater than the parallax change threshold, the parallax adjustor 80 may adjust the parallax parameter of the current frame of the 3D video such that the difference is within the parallax change threshold.

The parallax change threshold may be previously determined, or dynamically determined according to the current degree of eyestrain of the user. For example, the parallax change threshold may be a predetermined threshold used to measure a variation in the mean parallax or parallax range, or may be a unique threshold used to measure a variation in a mean parallax or a parallax range that corresponds to the current degree of eyestrain of the user. In detail, an appropriate parallax parameter adjustment function $p'=f'(t, p)$ may be selected according to the preset condition, and the parallax parameter of the current frame of the 3D video may be adjusted according to the parallax parameter adjustment function p'=f'(t, p) such that the difference between the parallax parameters of the current frame and the previous frame of the 3D video is within the parallax change threshold. In the parallax parameter adjustment function p'=f'(t, p), p' may refer to the parallax parameter of the 3D video after being adjusted, t may refer to the current degree of eyestrain of the user, p may refer to the parallax parameter of the 3D video before being adjusted. In the parallax parameter adjustment function p'=f'(t, p), the parallax parameter threshold may be a decrease function of the current degree of eyestrain of the user. In other words, the parallax change threshold of the 3D video may decrease as the current degree of eyestrain of the user increases.

As another example, when the current degree of eyestrain of the user is equal to or greater than the eyestrain threshold, the parallax adjustor 80 may adjust the parallax according to the visual characteristics of a human eye that the human eye focuses when viewing an object. The parallax adjustor 80 may determine whether a difference between parallax parameters of a current frame and a previous frame of the 3D video is equal to or greater than a parallax change threshold. When the difference is equal to or greater than the parallax change threshold, the parallax adjustor 80 may adjust the parallax parameter of the current frame of the 3D video such that the difference is within the parallax change threshold.

The device 1000 illustrated in FIG. 3 may further include an output interface (not shown) for outputting the 3D video to the user according to the adjusted parallax parameter. For example, the output interface may be a display device (e.g., a display).

According to the above-described method, in order to achieve a technical effect of 3D image display while complying with the physiological properties of human eyes, the 3D display effect can be adjusted according to the current degree of eyestrain of the user at an appropriate moment, thereby maximizing the stereoscopic display effect of the 3D video while reducing the eyestrain of the user.

Figure 4:
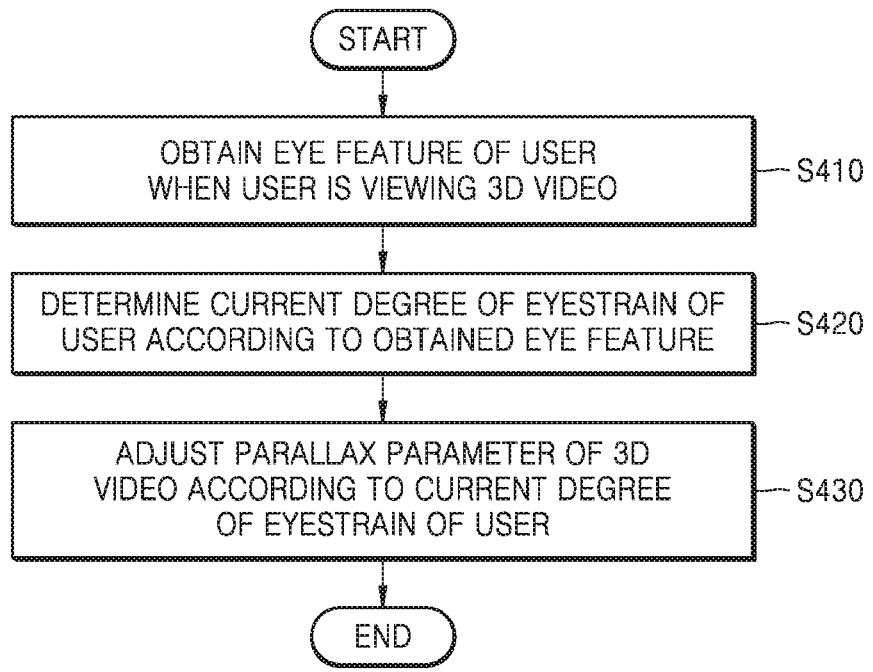
FIG. 4 illustrates a flowchart of a method of adjusting a 3D display effect, according to an embodiment of the present disclosure.

FIG. 4 illustrates a flowchart of a method of adjusting a 3D display effect, according to an embodiment of the present disclosure.

The method may be implemented by the device 1000 illustrated in FIG. 3, or may be completely accomplished as software through an application for adjusting a 3D display effect.

Referring to FIG. 4, in operation S410, an eye feature of a user when the user is viewing a 3D video may be obtained.

In detail, an image capturing device may capture a head image of the user when the user is viewing the 3D video, and, after the head image of the user is obtained, a face recognition may be performed on the head image of the user based on a computer vision library so as to parse an eye image of the user from a recognized face region. The eye feature of the user may be extracted from the obtained eye image of the user.

For example, at least one of a blinking frequency, an eye-closed time, a change in binocular focus points, and a binocular convergence angle may be extracted as the eye feature from the captured eye image of the user when the user is viewing the 3D video.

In operation S420, a current degree of eyestrain of the user may be determined according to the obtained eye feature. For example, the degree of eyestrain may be a value representing a current degree of eyestrain of the user that is dynamically determined based on the obtained eye feature. For example, when the eye feature obtained in operation S410 is a change in binocular focus points of the user, a value representing the current degree of eyestrain of the user may synthetically analyzed based on the change in the binocular focus points of the user.

In operation S430, a parallax parameter of the 3D video may be adjusted according to the current degree of eyestrain of the user. The parallax parameter may refer to a mean parallax or parallax range of each pixel pair between a left eye image and a right eye image of the 3D video. As described above, the parallax may refer to a difference between the positions of the same object in left and right eye images. Accordingly, in order to obtain the parallax parameter of the 3D video, an image matching method in which a pixel corresponding to, namely, matched with, each pixel in the left eye image is detected from the right eye image and a parallax between two matched pixels (i.e., a difference of displacement) is obtained may be executed.

As the parallax of each pixel in the 3D video is obtained, a mean parallax of the 3D video or a parallax range comprised of a maximum parallax and a minimum parallax may be obtained. By adjusting the mean parallax or the parallax range, the user's eyestrain may be degraded.

In detail, the parallax parameter of the 3D video may be adjusted based on the current degree of eyestrain of the user in an appropriate way. Examples of adjusting a display image of the 3D video will be described in detail with reference to FIGS. 5 through 9.

Figure 5:
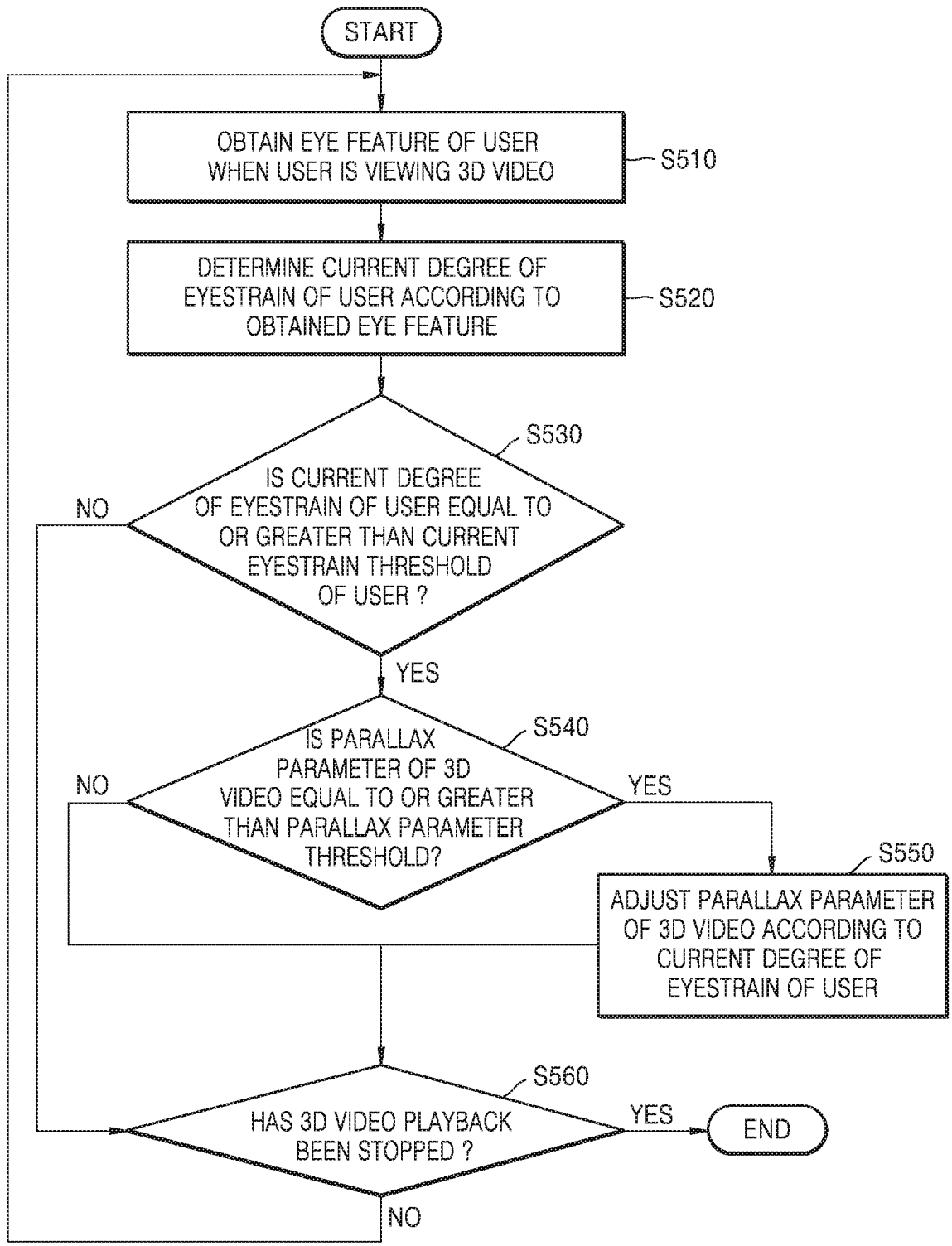
FIG. 5 illustrates a flowchart of a method of adjusting a 3D display effect, according to another embodiment of the present disclosure.

FIG. 5 illustrates a flowchart of a method of adjusting a 3D display effect, according to another embodiment of the present disclosure.

Referring to FIG. 5, operations S510 and S520 are similar to operation S410 and S420 as illustrated in FIG. 4, and thus descriptions thereof will be omitted herein.

In operation S530, it may be determined whether the current degree of eyestrain of the user is equal to or greater than an eyestrain threshold. The eyestrain threshold may be a preset critical value used to determine whether the user experiences eye fatigue. In detail, by comparing the current degree of eyestrain of the user with the eyestrain threshold, it may be determined whether a 3D display effect should be adjusted.

In detail, when the current degree of eyestrain of the user is less than the eyestrain threshold, the parallax parameter of the 3D video may not be adjusted. Accordingly, in operation S560, it may be determined whether a 3D video playback has been stopped. When the 3D video playback has not been stopped, the method may return to operation S510, thereby continuing to obtain an eye feature of the user when the user is viewing the 3D video.

On the other hand, when the current degree of eyestrain of the user is equal to or greater than the eyestrain threshold, in operation S540, it may be determined whether the parallax parameter of the 3D video is equal to or greater than a parallax parameter threshold. For example, the parallax parameter threshold may be previously determined, or dynamically determined according to the current degree of eyestrain of the user. For example, the parallax parameter threshold may be a predetermined mean parallax or parallax range, or a unique mean parallax, or a parallax range that corresponds to the current degree of eyestrain of the user.

When the parallax parameter is equal to or greater than the parallax parameter threshold, in operation S550, the parallax parameter of the 3D video may be adjusted to be within the parallax parameter threshold.

Hereafter, an example of adjusting a parallax parameter when the parallax parameter is equal to or greater than a parallax parameter threshold will be described in conjunction with FIGS. 6A and 6B. For example, the parallax parameter may be particularly a parallax range of a 3D video, and accordingly the parallax parameter threshold may refer to an allowable parallax range.

Figure 6A:
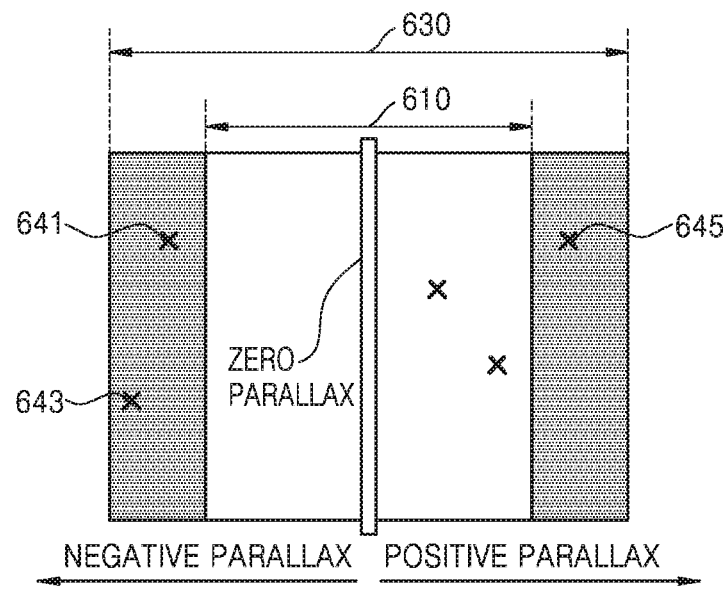
FIGS. 6A and 6B illustrates an example of adjusting a parallax parameter, according to an embodiment of the present disclosure.
Figure 6B:
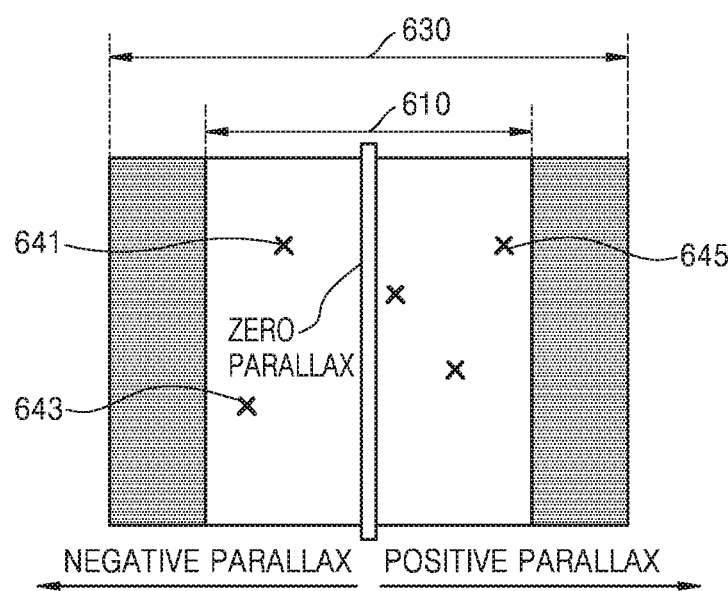

In detail, referring to FIGS. 6A and 6B, a portion with a light color may correspond to a parallax value within a parallax parameter threshold 610, and a portion with a dark color may correspond to a parallax value equal to or greater than the parallax parameter threshold 610. In FIGS. 6A and 6B, "x" may refer to an illustrative parallax from among parallaxes between matched pixels in one frame. A left-most pixel 643 may be a pixel having a maximum value of a negative parallax in one frame, and a right-most pixel 645 may be a pixel having a maximum value of a positive parallax in the frame.

In detail, as illustrated in FIG. 6A, an interval 630 between dashed lines may refer to the parallax range of the 3D video. As illustrated in FIG. 6A, some pixels, namely, pixels 641, 643, and 645, the parallaxes of which are equal to or greater than the parallax parameter threshold, may be adjusted such that the parallaxes are less than or equal to the parallax parameter threshold.

In addition, as illustrated in FIG. 6A, in order to relieve the eyestrain of the user, the parallax range 630 may be reduced to be within the parallax parameter threshold 610. An appropriate parallax parameter adjustment function $p=f(t, d)$ may be selected, and the parallax parameter of the 3D video may be adjusted (reduced) to be within the parallax parameter threshold according to the parallax parameter adjustment function $p=f(t, d)$, in which p may refer to a parallax parameter of the 3D video after being adjusted, t may refer to the current degree of eyestrain of the user, and d may refer to a parallax parameter of the 3D video before being adjusted. In the parallax parameter adjustment function $p=f(t, d)$, the parallax parameter threshold may be a decrease function of the current degree of eyestrain of the user. In other words, the parallax parameter threshold of the 3D video may decrease as the current degree of eyestrain of the user increases. Through such an adjustment, the parallax range 630 of the 3D video may be indicated by the dashed lines as shown in FIG. 6B. In other words, the pixels 641, 643, and 645 which were originally equal to or greater than the parallax parameter threshold may be adjusted to be within the parallax parameter threshold, thereby reducing the degree of eyestrain of the user.

After the parallax parameter of the 3D video is adjusted, in operation S560, it may be determined whether a 3D video playback has been stopped. When the 3D video playing has not been stopped, the method may return to operation S510.

In addition, according to the visual characteristic of a human eye that the human eye focuses when viewing an object, the human eye needs to focus when watching an object. In daily life, most of scenes are viewed by a human eye with a fixed focus. A focus point may be changed only when the user wants to view an object at another distance. For example, the focus point of a human eye may be always kept on a book page when reading the book, and the focus point of a human eye may be always kept on a display panel when watching a traditional 2D video. In this case, a human eye does not need to significantly and frequently adjust a focal length, so that an eyestrain may not be caused by a focus point change. However, when viewing a 3D stereoscopic video, because the scene changes constantly, virtual subjects change at different depths, and accordingly the focal length may change constantly. In order to see the objects in the video clearly, an eye needs to perform a corresponding focusing adjustment. Accordingly, during watching the 3D video, such an adjustment is forced, and thus an eye muscle fatigue may be caused.

When the eye of a human cannot keep pace with the change frequency of the video parallax due to physical limitations, the human is unable to see an image clearly and may feel dizzy and uncomfortable. In this case, the method of improving a viewing comfort level only by reducing the parallax parameter to some extent so as to weaken the stereoscopic effect has a disadvantage in that a user may feel uncomfortable due to the constantly changing parallax. For this reason, according to an embodiment of the present disclosure, the parallax parameter may be adjusted according to the visual characteristic of a human eye that the human eye focuses when viewing an object, so as to ensure a smooth change in the parallax, and thus the human eye may not feel uncomfortable due to the constantly changing parallax. Hereinafter, an example in which, when the current degree of eyestrain of the user is equal to or greater than the eyestrain threshold, the parallax parameter is adjusted according to the visual characteristic of a human eye that the human eye focuses when viewing things will be described in detail with reference to FIGS. 7 through 9.

Figure 7:
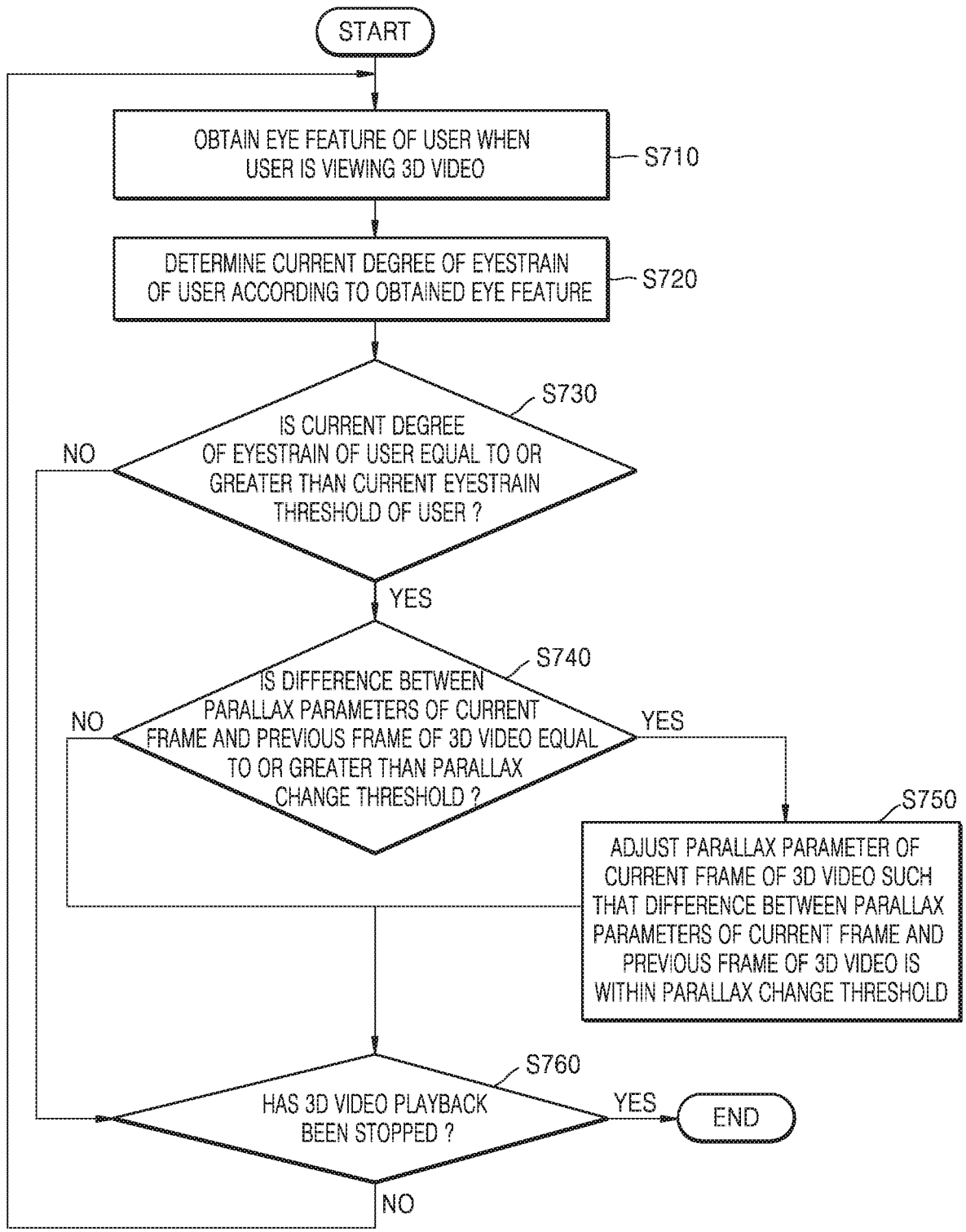
FIG. 7 illustrates a flowchart of a method of adjusting a 3D display effect, according to another embodiment of the present disclosure.

FIG. 7 illustrates a flowchart of a method of adjusting a 3D display effect, according to another embodiment of the present disclosure.

Referring to FIG. 7, operations S710 and S720 are similar to operation S410 and S420 as illustrated in FIG. 4, and thus descriptions thereof will be omitted herein.

In operation S730, it may be determined whether the current degree of eyestrain of the user is equal to or greater than an eyestrain threshold. The eyestrain threshold may be a preset critical value used to determine whether the user experiences eye fatigue. In detail, by comparing the current degree of eyestrain of the user with the eyestrain threshold, it may be determined whether a 3D display effect should be adjusted.

In detail, when the current eyestrain degree of the user is less than the eyestrain threshold, the parallax parameter of the 3D video may not be adjusted. Accordingly, in operation S760, it may be determined whether a 3D video playback has been stopped. When the 3D video playback has not been stopped, the method may return to operation S710, thereby continuing to obtain an eye feature of the user when the user is viewing the 3D video.

On the other hand, when the current degree of eyestrain of the user is equal to or greater than the eyestrain threshold, in operation S740, it may be determined whether a difference between parallax parameters of a current frame and a previous frame of the 3D video is equal to or greater than a parallax change threshold. For example, the parallax change threshold may be previously determined, or dynamically determined according to the current degree of eyestrain of the user. For example, the parallax change threshold may be a predetermined threshold used to measure a variation in the mean parallax or parallax range, or may be a predetermined unique threshold used to measure a variation in a mean parallax or parallax range corresponding to the current degree of eyestrain of the user.

When the difference between the parallax parameters of the current frame and the previous frame of the 3D video is equal to or greater than the parallax change threshold, the parallax parameter of the current frame of the 3D video may be adjusted such that the difference is within the parallax change threshold, in operation S750.

Figure 8A:
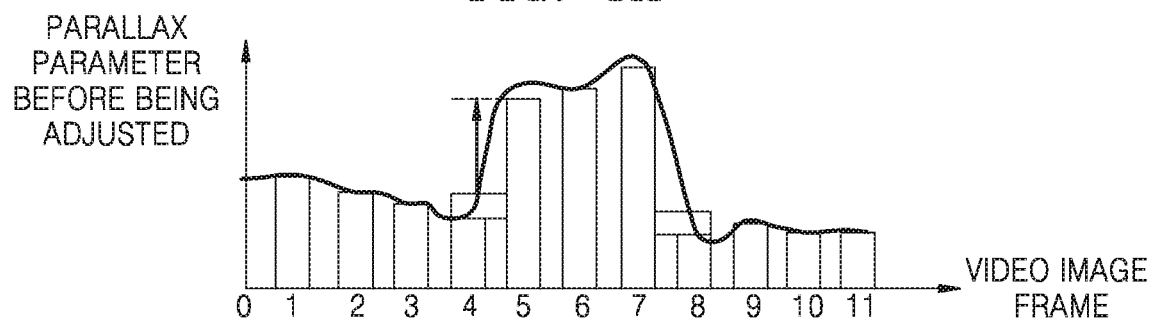
FIGS. 8A and 8B illustrates an example of adjusting a parallax parameter, according to another embodiment of the present disclosure.

Hereinafter, an example of adjusting a parallax parameter when the parallax parameter change between the current frame and the previous frame is equal to or greater than a parallax change threshold will be illustrated with reference to FIGS. 8A and 8B. For example, the parallax parameter is a mean parallax of a 3D video's image frame, and accordingly the parallax change threshold refers to an allowable variation in the mean parallax between two adjacent frame images. FIG. 8A may be a graph showing a mean parallax of each of consecutive frames. FIG. 8A may also be a graph showing a maximum value of a negative parallax from among respective parallaxes of consecutive frames. FIG. 8A may also be a graph showing a maximum value of a positive parallax from among respective parallaxes of consecutive frames. Also, FIG. 8A may be a graph showing a parallax range of each frame.

In detail, two types of parallax parameter changes, which are a positive parallax change and a negative parallax change, may be defined. With respect to the positive parallax change, a value acquired by subtracting the parallax parameter of the previous frame from the parallax parameter of the current frame may be positive. In other words, the parallax parameter of the current frame may be larger than the parallax parameter of the previous frame. For example, a positive parallax change may be acquired by subtracting the parallax parameter of frame 4 from the parallax parameter of frame 5 in FIG. 8A. On the other hand, with respect to the negative parallax change, a value acquired by subtracting the parallax parameter of the previous frame from the parallax parameter of the current frame may be negative. In other words, the parallax parameter of the current frame may be smaller than the parallax parameter of the previous frame. For example, a negative parallax change may be acquired by subtracting the parallax parameter of frame 7 from the parallax parameter of frame 8 in FIG. 8A.

In order to ensure a smooth change in the parallax parameter, regardless of whether the current frame has a positive parallax change or a negative parallax change, when the parallax parameter change between a current frame and a previous frame is equal to or greater than a parallax change threshold, the parallax parameter of the current frame may be adjusted.

Referring to FIG. 8A, frames 1 to 4 form a successive negative parallax change with a moderate variation (i.e., the parallax change is less than the parallax change threshold). Therefore, it may not be required to perform a corresponding parallax parameter adjustment. However, since the positive parallax change acquired by subtracting the parallax parameter of frame 4 from the parallax parameter of frame 5 is equal to or greater than the parallax change threshold, in order to relieve the eyestrain of the user, it is required to reduce the parallax parameter of frame 5 such that the difference between the parallax parameter of frame 5 and the parallax parameter of frame 4 is within the parallax change threshold.

An appropriate parallax parameter adjustment function $p'=f'(t, p)$ may be selected, and the parallax parameter of frame 5 of the 3D video may be adjusted according to the parallax parameter adjustment function $p'=f'(t, p)$ such that the difference between the parallax parameters of frames 4 and 5 of the 3D video is within the parallax change threshold. In the parallax parameter adjustment function $p'=f'(t, p)$, p may refer to the parallax parameter of the 3D video after being adjusted, t may refer to the current degree of eyestrain of the user, p may refer to the parallax parameter of the 3D video before being adjusted. In the parallax parameter adjustment function $p'=f'(t, p)$, the parallax parameter threshold may be a decrease function of the current degree of eyestrain of the user. In other words, the parallax change threshold of the 3D video may decrease as the current degree of eyestrain of the user increases.

Figure 8B:
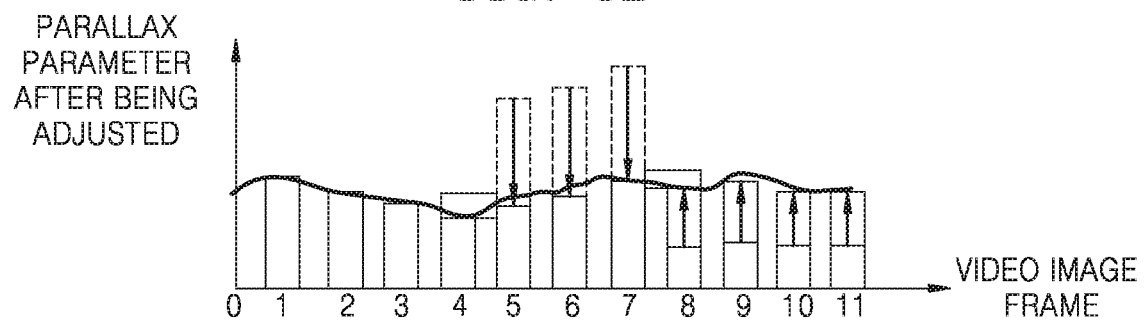

Through such an adjustment, the parallax parameter of frame 5 of the 3D video may be reduced as shown in FIG. 8B. In other words, the difference between the parallax parameters of frames 4 and 5 may be adjusted to be within the parallax change threshold. In addition, since frames 6 and 7 change relatively largely compared with the adjusted image frame (i.e., the variations in frames 6 and 7 are equal to or greater than the parallax change threshold), the parallax parameters of frames 6 and 7 may be adjusted in the same way so as to obtain the adjusted frames 6 and 7 as illustrated in FIG. 8B.

On the other hand, referring to FIGS. 8A and 8B, since a difference obtained by subtracting the adjusted parallax parameter of frame 7 from the parallax parameter of frame 8 is equal to or greater than the parallax change threshold, in order to relieve the eyestrain of the user, it is required to reduce the parallax parameter of frame 8 such that the difference between the parallax parameter of frame 8 and the parallax parameter of frame 7 is within the parallax change threshold. Accordingly, similar to the above manner, the parallax parameter of frame 8 may be adjusted (increased) according to the parallax parameter adjustment function $p'=f'(t, d)$, so that the difference between the parallax parameter of frame 8 and the parallax parameter of frame 7 is within the parallax change threshold.

Moreover, since frames 9 to 11 form a successive negative parallax change with a relatively large variation (i.e., the parallax change is equal to or greater than the parallax change threshold), these three frames may be adjusted in a similar way as that for frame 8 so as to obtain adjusted respective image frames as shown in FIG. 8B. As can be seen in the above manner, a smooth change in the parallax parameter can be guaranteed, thereby reducing the degree of eyestrain of the user.

Hereinafter, in conjunction with a more specific example, a method of adjusting a parallax parameter according to the human eye focusing characteristics when a scene change happens will be disclosed.

As described above, since the depths of objects in the 3D video change constantly, the parallax parameters change as well, and frequently changed focusing makes a user feel uncomfortable in his or her eyes. Such a depth change may happen in the same scene, or happen when a scene change happens.

Figure 9A:
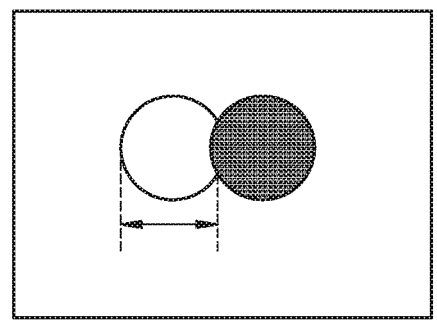
FIGS. 9A, 9B and 9C illustrates an example of adjusting a parallax parameter based on a human eye focusing characteristic when changing a scene, according to an embodiment of the present disclosure.
Figure 9B:
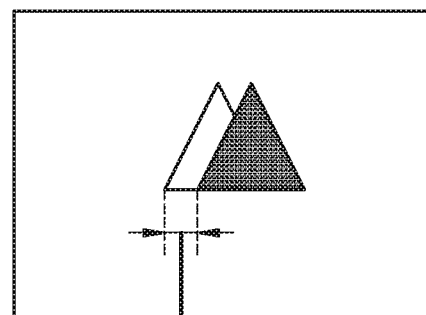
Figure 9C:
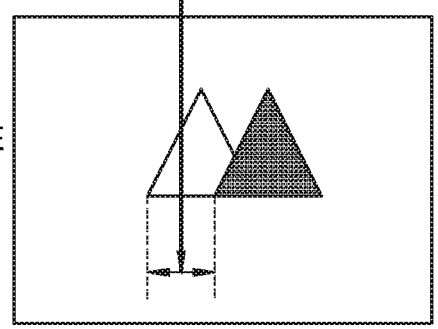

FIGS. 9A, 9B and 9C illustrates an example of adjusting a parallax parameter based on a human eye focusing characteristic when changing a scene, according to an embodiment of the present disclosure. Referring to FIGS. 9A, 9B and 9C, a scene change may happen in 3D video pictures, and a round object in a picture may be replaced by a triangular object. For clarity, the same objects in left and right eye pictures are represented by different shades. An object with a bright color may refer to a left eye picture, and an object with a dark color may refer to a right eye picture. As can be seen from FIGS. 9A and 9B, there is a relatively large positive parallax in the picture in FIG. 9A, and there is a relatively small positive parallax in the picture in FIG. 9B. It can thus be seen that with respect to a current frame, a relatively large negative parallax change may be obtained by subtracting a relatively large positive parallax of a previous frame from a relatively small positive parallax of the current frame. When the negative parallax change is equal to or greater than the parallax change threshold, the parallax parameter needs to be adjusted.

For example, in this specific example, an adjustment may be performed by increasing or extending the parallax parameter of the current frame. The adjusted image frame is illustrated in FIG. 9C. As illustrated in FIG. 9C, the processed frame image has a relatively large positive parallax with respect to FIG. 9B, and thus the adjusted positive parallax of the current frame may become relatively close to the positive parallax of the previous frame, and a parallax parameter change in the current frame may be within the parallax change threshold.

Referring back to FIG. 7, after the parallax parameter of the 3D video is adjusted, in operation S760, it may be determined whether a 3D video playback has been stopped. When the 3D video playing has not been stopped, the method may return to operation S710.

Through the above process, the parallax change that forces the eye to change a focal length may be reduced according to a visual characteristic of a human eye that the human eye focuses when viewing things. Thus, the flatness of the parallax may be ensured during a playback process of the 3D video. Accordingly, the playback of the 3D video may comply with the physiological property of human eyes to a higher degree while guaranteeing the 3D visual effect, in order to improve the visual comfort level of the user.

In addition, in order to achieve a better adjustment effect, the two manners described above may be combined.

Figure 10:
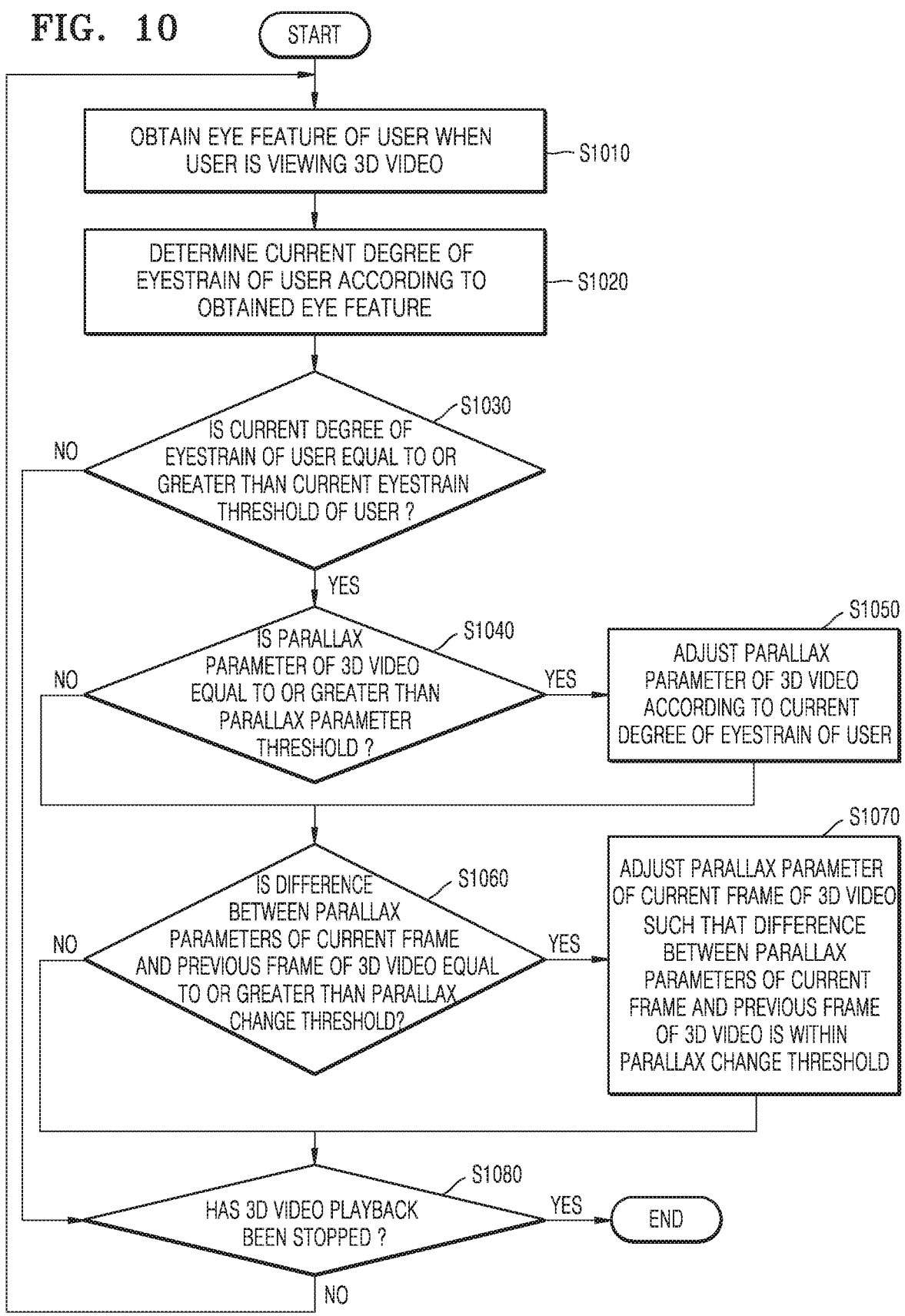
FIG. 10 illustrates a flowchart of a method of adjusting a 3D display effect, according to another embodiment of the present disclosure.

FIG. 10 illustrates a flowchart of a method of adjusting a 3D display effect, according to another embodiment of the present disclosure.

Referring to FIG. 10, operations S1010 and S1020 are similar to operation S410 and S420 as illustrated in FIG. 4, and thus descriptions thereof will be omitted herein.

In operation S1030, it may be determined whether the current degree of eyestrain of the user is equal to or greater than an eyestrain threshold. The eyestrain threshold may be a preset critical value used to determine whether the user experiences eye fatigue. In detail, by comparing the current degree of eyestrain of the user with the eyestrain threshold, it may be determined whether a 3D display effect should be adjusted.

In detail, when the current degree of eyestrain of the user is less than the eyestrain threshold, the parallax parameter of the 3D video may not be adjusted. Accordingly, in operation S1080, it may be determined whether a 3D video playback has been stopped. When the 3D video playback has not been stopped, the method may return to operation S1010, thereby continuing to obtain an eye feature of the user when the user is viewing the 3D video.

On the other hand, when the current degree of eyestrain of the user is equal to or greater than the eyestrain threshold, in operation S1040, it may be determined whether the parallax parameter of the 3D video is equal to or greater than a parallax parameter threshold. For example, the parallax parameter threshold may be previously determined, or dynamically determined according to the current degree of eyestrain of the user. For example, the parallax parameter threshold may be a predetermined mean parallax, a predetermined parallax range, or a predetermined unique mean parallax, or may be a parallax range corresponding to the current degree of eyestrain of the user.

When the parallax parameter is equal to or greater than the parallax parameter threshold, in operation S1050, the parallax parameter of the 3D video may be adjusted to be within the parallax parameter threshold.

Moreover, preferably, in operation S1060, it may be determined whether a difference between parallax parameters of a current frame and a previous frame of the 3D video is equal to or greater than a parallax parameter threshold. For example, the parallax change threshold may be previously determined, or dynamically determined according to the current degree of eyestrain of the user. For example, the parallax change threshold may be a predetermined threshold used to measure a variation in the mean parallax or parallax range, or may be a predetermined unique threshold used to measure a variation in a mean parallax or parallax range corresponding to the current degree of eyestrain of the user.

When the difference between the parallax parameters of the current frame and the previous frame of the 3D video is equal to or greater than the parallax change threshold, the parallax parameter of the current frame of the 3D video may be adjusted such that the difference is within the parallax change threshold, in operation S1070.

After the parallax parameter of the 3D video is adjusted, in operation S1080, it may be determined whether a 3D video playback has been stopped. When the 3D video playing has not been stopped, the method may return to operation S1010.

As described above, in the device 1000 and the method, the 3D display effect can be adjusted according to the current degree of eyestrain of the user at an appropriate moment, thereby ensuring the stereoscopic display effect of the 3D video while reducing the eyestrain of the user. Accordingly, a technical effect of 3D image display complying with the physiological property of human eyes may be obtained.

Figure 11:
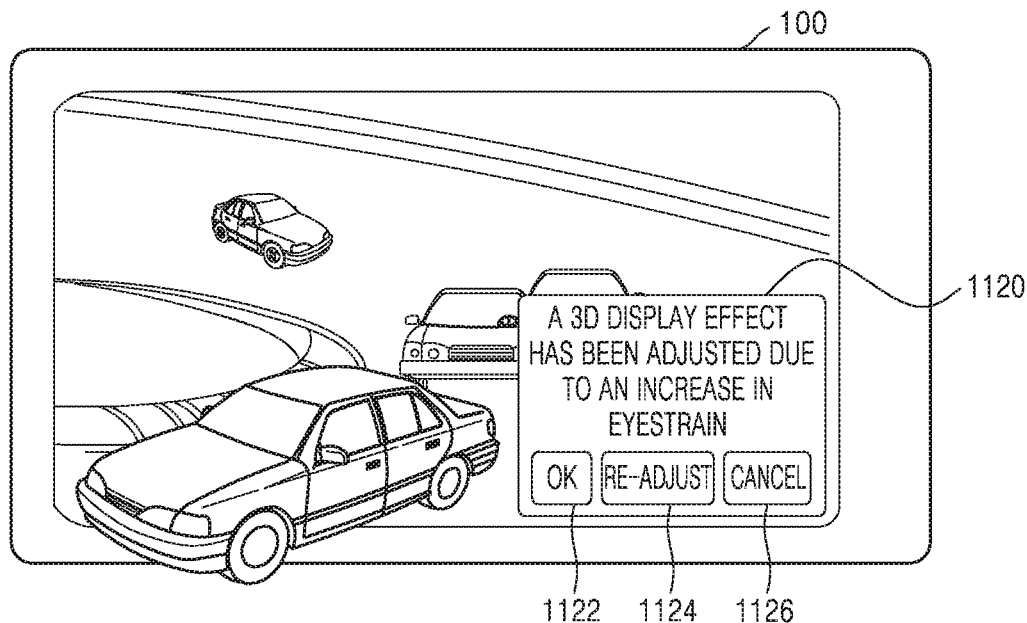
FIG. 11 illustrates a user interface for adjusting a 3D display effect, according to an embodiment of the present disclosure.

FIG. 11 illustrates a user interface for adjusting a 3D display effect, according to an embodiment of the present disclosure.

Referring to FIG. 11, after the device 1000 automatically performs a parallax adjustment on 3D video, the device 1000 may display a notification window 1120 indicating that the parallax adjustment has been completed.

The notification window 1120 may include an OK button 1122, a re-adjust button 1124, and a cancel button 1126.

In response to a user input of selecting the OK button 1122, the device 1000 may delete the notification window. According to an embodiment, the device 1000 may delete the notification window when a preset time period lapses.

In response to a user input of selecting the re-adjust button 1124, the device 1000 may continuously adjust the parallax of the 3D video, based on a current parallax parameter threshold, regardless of the degree of eyestrain of a user In response to a user input of selecting the cancel button 1126, the device 1000 may return the parallax-adjusted 3D video back to the original state in which the 3D video is not adjusted.

Figure 12:
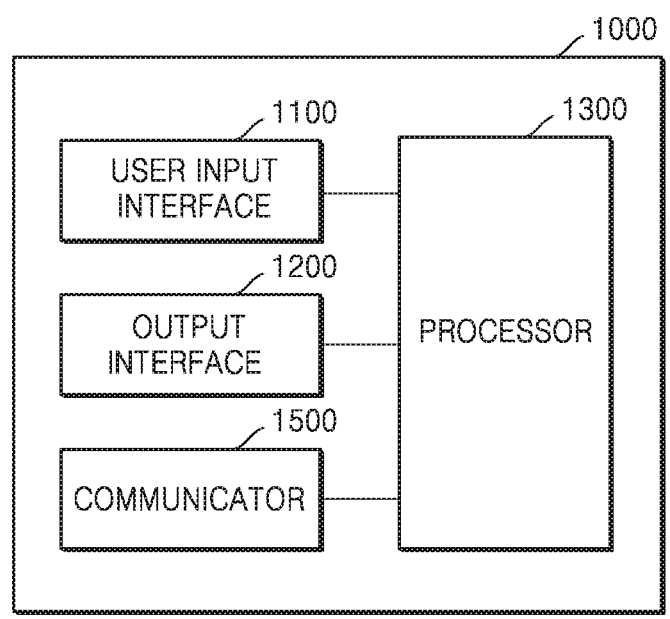
FIG. 12 is a block diagram of a device according to an embodiment of the present disclosure.

FIGS. 12 and 13 are block diagrams of devices 1000 according to some embodiments.

Referring to FIG. 12, the device 1000 may include a user input interface 1100, an output interface 1200, a processor 1300, and a communicator 1500. All of the components illustrated in FIG. 12 are not essential components of the device 1000. More or less components than those illustrated in FIG. 12 may constitute the device 1000.

For example, referring to FIG. 13, the device 1000 may further include a sensing unit 1400, an audio/video (A/V) input interface 1600, and a memory 1700, in addition to the user input interface 1100, the output interface 1200, the processor 1300, and the communicator 1500.

A camera 1610 may be attached to the device 1000 and capture a face image including the eyes of a user. The camera 1610 may be attached to the glasses (not shown) of a user for watching 3D video and may capture an eye image of the user.

The user input interface 1100 denotes means via which a user inputs data for controlling the device 1000. For example, the user input interface 1100 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The user input interface 1100 may receive a user input of adjusting the parallax of the 3D video.

The output interface 1200 may output an audio signal, a video signal, or a vibration signal, and may include a display 1210, an audio output interface 1220, and a vibration motor 1230.

The display 1210 displays information that is processed by the device 1000. For example, the display 1210 may display the 3D video. The display 1210 may also display a notification window indicating that the parallax of the 3D video has been adjusted.

When the display 1210 forms a layer structure together with a touch pad to construct a touch screen, the display 1210 may be used as an input device as well as an output device. The display 1210 may include at least one of a liquid crystal display (LCD), a thin film transistor-liquid crystal display (TFT-LCD), an organic light-emitting diode (OLED), a flexible display, a 3D display, and an electrophoretic display. According to embodiments of the device 1000, the device 1000 may include at least two displays 1210. The at least two displays 1210 may be disposed to face each other by using a hinge.

The audio output interface 1220 outputs audio data that is received from the communicator 1500 or stored in the memory 1700. The audio output interface 1220 may also output an audio signal (for example, a call signal receiving sound, a message receiving sound, a notification sound) related with a function of the device 1000. The audio output interface 1220 may include, for example, a speaker and a buzzer.

The vibration motor 1230 may output a vibration signal. For example, the vibration motor 1230 may output a vibration signal corresponding to an output of audio data or video data (for example, a call signal receiving sound or a message receiving sound). The vibration motor 1230 may also output a vibration signal when a touch screen is touched.

The processor 1300 typically controls all operations of the device 1000. For example, the processor 1300 may control the user input interface 1100, the output interface 1200, the sensing unit 1400, the communicator 1500, the A/V input unit 1600, and the like by executing programs stored in the memory 1700.

For example, the processor 1300 may obtain an eye feature of the user from a captured eye image of the user, determine a current degree of eyestrain of the user based on the obtained eye feature, and adjust the parallax of the 3D video according to the current degree of eyestrain of the user.

For example, the processor 1300 may adjust the parallax of the 3D video by adjusting a change rate of a parallax between frames of the 3D video. In this case, the processor 1300 may determine whether a difference between parallaxes of a current frame and a previous frame of the 3D video is equal to or greater than a parallax change threshold. When the difference is equal to or greater than the parallax change threshold, the processor 1300 may adjust the parallax of the current frame of the 3D video such that the difference is within the parallax change threshold, thereby adjusting a change rate of the parallaxes between the current and previous frames of the 3D video.

The processor 1300 may also determine whether the current degree of eyestrain of the user is equal to or greater than an eyestrain threshold. When the current degree of eyestrain of the user is equal to or greater than the eyestrain threshold, the processor 1300 may adjust the parallax of the 3D video.

In addition, when the current degree of eyestrain of the user is equal to or greater than the eyestrain threshold, the processor 1300 may determine whether the parallax of the 3D video is equal to or greater than a parallax threshold. When the parallax is equal to or greater than the parallax threshold, the processor 1300 may adjust the parallax of the 3D video to be within the parallax threshold.

Moreover, the processor 1300 may adjust the parallax change threshold according to the current degree of eyestrain of the user. Moreover, the processor 1300 may adjust the parallax parameter threshold according to the current degree of eyestrain of the user.

For example, when the current degree of eyestrain of the user is large, the processor 1300 may lower the parallax change threshold and the parallax parameter threshold. The processor 1300 may adjust the parallax of the 3D video, based on the lowered parallax change threshold and the lowered parallax parameter threshold.

The sensing unit 1400 may sense the status of the device 1000 or the status of the surrounding of the device 1000 and may transmit information corresponding to the sensed status to the processor 1300.

The sensing unit 1400 may include, but is not limited thereto, at least one selected from a magnetic sensor 1410, an acceleration sensor 1420, a temperature/humidity sensor 1430, an infrared sensor 1440, a gyroscope sensor 1450, a position sensor (e.g., a global positioning system (GPS)) 1460, a pressure sensor 1470, a proximity sensor 1480, and an RGB sensor 1490 (i.e., an illuminance sensor). Functions of most of the sensors would be instinctively understood by one of ordinary skill in the art in view of their names and thus detailed descriptions thereof will be omitted herein.

The communicator 1500 may include at least one component that enables the device 1000 to perform data communication with and another device (not shown) or a server (not shown). For example, the communicator 1500 may include a short-range wireless communication unit 1510, the mobile communication unit 1520, and a broadcasting reception unit 1530.

The short-range wireless communication unit 1510 may include, but is not limited to, a Bluetooth communicator, a BLE communicator, an NFC unit, a wireless local area network (WLAN) (e.g., Wi-Fi) communicator, a ZigBee communicator, an infrared Data Association (IrDA) communicator, a WFD communicator, an UWB communicator, an Ant+ communicator, and the like.

The mobile communication unit 1520 may exchange a wireless signal with at least one selected from a base station, an external terminal, and a server on a mobile communication network. Here, examples of the wireless signal may include a voice call signal, a video call signal, and various types of data according to text/multimedia messages transmission.

The broadcasting reception unit 1530 receives a broadcasting signal and/or broadcasting-related information from an external source via a broadcasting channel. The broadcasting channel may be a satellite channel, a ground wave channel, or the like. According to embodiments, the device 1000 may not include the broadcasting reception unit 1530.

The A/V input interface 1600 is to input an audio signal or a video signal, and may include the camera 1610 and a microphone 1620. The camera 1610 may acquire an image frame, such as a still image or a moving picture, via an image sensor in a video call mode or a photography mode. An image captured via the image sensor may be processed by the processor 1300 or a separate image processor (not shown).

The image frame obtained by the camera 1610 may be stored in the memory 1700 or transmitted to the outside via the communicator 1500. At least two cameras 1610 may be included according to embodiments of the structure of a terminal.

The microphone 1620 receives an external audio signal and converts the external audio signal into electrical audio data. For example, the microphone 1620 may receive an audio signal from an external device or a speaking person. The microphone 1620 may use various noise removal algorithms in order to remove noise that is generated while receiving the external audio signal.

The memory 1700 may store a program used by the processor 1300 to perform processing and control, and may also store data that is input to or output from the device 1000.

The memory 1700 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The programs stored in the memory 1700 may be classified into a plurality of modules according to their functions, for example, a UI module 1710, a touch screen module 1720, and a notification module 1730.

The UI module 1710 may provide a UI, graphical user interface (GUI), or the like that is specialized for each application and interoperates with the device 1000. The touch screen module 1720 may detect a touch gesture on a touch screen of a user and transmit information regarding the touch gesture to the processor 1300. The touch screen module 1720 according to an embodiment may recognize and analyze a touch code. The touch screen module 1720 may be configured by separate hardware including a controller.

In order to detect the actual touch or the proximate touch on the touch pad, the touch screen may internally or externally have various sensors. An example of a sensor used to detect a real touch or a proximity touch on the touch screen is a tactile sensor. The tactile sensor denotes a sensor that detects a touch by a specific object to a degree to which a human feels or more. The tactile sensor may detect various types of information, such as the roughness of a touched surface, the hardness of the touching object, and the temperature of a touched point.

Another example of a sensor used to detect the real touch or the proximity touch on the touch screen is a proximity sensor.

The proximity sensor senses the existence of an object that approaches the predetermined sensing surface or an object that exists nearby, without mechanical contact, by using an electromagnetic force or infrared rays. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, and an infrared-type proximity sensor. Examples of the touch gesture of the user may include tap, touch and hold, double tap, drag, panning, flick, drag and drop, swipe, and the like.

The notification module 1730 may generate a signal for notifying that an event has been generated in the device 1000. Examples of the event generated in the electronic apparatus 1000 may include call signal receiving, message receiving, a key signal input, schedule notification, and the like. The notification module 1730 may output a notification signal in the form of a video signal via the display 1210, in the form of an audio signal via the audio output interface 1220, or in the form of a vibration signal via the vibration motor 1230.

The embodiment of the present invention can be embodied in a storage medium including instruction codes executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes any information transmission medium.

While one or more embodiments have been described with reference to the figures, it will be understood by those of ordinary skill in the art that various changes in form and details may be made therein without departing from the spirit and scope as defined by the following claims.

Although general terms widely used at present were selected for describing the present invention in consideration of the functions thereof, these general terms may vary according to intentions of one of ordinary skill in the art, case precedents, the advent of new technologies, and the like. Terms arbitrarily selected by the applicant of the present invention may also be used in a specific case. In this case, their meanings need to be given in the detailed description of the invention. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms " . . . unit" and " . . . module" when used in this specification refers to a unit in which at least one function or In operation is performed, and may be implemented as hardware, software, or a combination of hardware and software.

Embodiments of the present invention are described in detail herein with reference to the accompanying drawings so that this disclosure may be easily performed by one of ordinary skill in the art to which the present invention pertain. The present disclosure may, however, be embodied in many different forms and should not be construed as being limited to the embodiments set forth herein. In the drawings, parts irrelevant to the description are omitted for simplicity of explanation, and like numbers refer to like elements throughout.

The invention claimed is:

1. A device comprising:
an image sensor to capture an image of eyes of a user who is watching three-dimensional (3D) video; and a processor configured to:
obtain an eye feature of the user from the captured image of the eyes of the user,
determine a current degree of eyestrain of the user based on the obtained eye feature, and adjust a parallax of the 3D video according to the current degree of eyestrain of the user,
wherein the processor is further configured to:
dynamically determine a parallax threshold based on the current degree of eyestrain,
determine whether the parallax of the 3D video is equal to or greater than the parallax threshold and, when the parallax of the 3D video is equal to or greater than the parallax threshold, adjust a parallax of the 3D video to be less than the parallax threshold.

2. The device of claim 1, wherein the processor adjusts the parallax of the 3D video by adjusting at least one of a mean parallax between a left eye image and a right eye image of the 3D video, a maximum value of a negative parallax between the left and right eye images, a maximum value of a positive parallax between the left and right eye images, and a parallax range that is a difference between the maximum value of the negative parallax and the maximum value of the positive parallax.

3. The device of claim 1, wherein the eye feature of the user comprises at least one of a blinking frequency, an eye-closed time, a change in binocular focus points, and a binocular convergence angle.

4. The device of claim 1, wherein, when the determined current degree of eyestrain of the user is equal to or greater than an eyestrain threshold, the processor adjusts the parallax of the 3D video.

5. The device of claim 1, wherein the processor adjusts the parallax of the 3D video by adjusting a change rate of a parallax between frames of the 3D video.

6. The device of claim 5, wherein the processor determines a difference between parallaxes of an n-th frame and an (n−1)th frame of the 3D video, and, when the difference between the parallaxes is equal to or greater than a third threshold, the processor adjusts the parallax of the n-th frame such that the difference between the parallaxes is less than the third threshold, to thereby adjust the change rate of the parallax between the frames of the 3D video.

7. The device of claim 6, wherein the processor increases the parallax of the n-th frame such that the difference between the parallaxes is less than the third threshold, to thereby adjust the change rate of the parallax between the frames of the 3D video.

8. The device of claim 1, further comprising an output interface,
wherein the processor controls the output interface to output, to the user, a parallax-adjusted 3D video obtained by adjusting the parallax of the 3D video.

9. The device of claim 8, wherein the device displays, on the output interface, a notification window indicating that the parallax of the 3D video has been adjusted.

10. A method of adjusting a three-dimensional (3D) display effect, the method comprising:
capturing an image of eyes of a user who is watching 3D video;
obtaining an eye feature of the user from an image of the captured image of the eyes of the user;
determining a current degree of eyestrain of the user, based on the obtained eye feature; and
adjusting a parallax of the 3D video according to the current degree of eyestrain of the user,
wherein adjusting of the parallax of the 3D video comprises:
dynamically determining a parallax threshold based on the current degree of eyestrain,
determining whether the parallax of the 3D video is equal to or greater than the parallax threshold, and, when the parallax of the 3D video is equal to or greater than the parallax threshold, adjusting a parallax of the 3D video to be less than the parallax threshold.

11. The method of claim 10, wherein the adjusting of the parallax of the 3D video according to the current degree of eyestrain of the user comprises adjusting at least one of a mean parallax between a left eye image and a right eye image of the 3D video, a maximum value of a negative parallax between the left and right eye images, a maximum value of a positive parallax between the left and right eye images, and a parallax range that is a difference between the maximum value of the negative parallax and the maximum value of the positive parallax.

12. The method of claim 10, wherein the eye feature of the user comprises at least one of a blinking frequency, an eye-closed time, a change in binocular focus points, and a binocular convergence angle.

13. The method of claim 10, wherein the adjusting of the parallax of the 3D video according to the current degree of eyestrain of the user comprises, when the determined current degree of eyestrain of the user is equal to or greater than a first threshold, adjusting the parallax of the 3D video.

14. The method of claim 10, wherein the adjusting of the parallax of the 3D video according to the current degree of eyestrain of the user comprises adjusting the parallax of the 3D video by adjusting a change rate of a parallax between frames of the 3D video.

15. The method of claim 14, wherein the adjusting of the parallax of the 3D video by adjusting the change rate of the parallax between frames of the 3D video comprises determining a difference between parallaxes of an n-th frame and an (n−1)th frame of the 3D video, and, when the difference between the parallaxes is equal to or greater than a third threshold, adjusting the parallax of the n-th frame such that the difference between the parallaxes is less than the third threshold, to thereby adjust the change rate of the parallax between the frames of the 3D video.

16. The method of claim 15, wherein the adjusting of the parallax of the n-th frame such that the difference between the parallaxes is less than the third threshold comprises increasing the parallax of the n-th frame such that the difference between the parallaxes is less than the third threshold, to thereby adjust the change rate of the parallax between the frames of the 3D video.

17. The method of claim 10, further comprising outputting, to the user, a parallax-adjusted 3D video obtained by adjusting the parallax of the 3D video.

18. The method of claim 17, further comprising displaying a notification window indicating that the parallax of the 3D video has been adjusted.

* * * * *